April 14, 1931.  R. F. P. DEFREGGER  1,801,143
ART OF COLOR PHOTOGRAPHY
Filed April 9, 1927
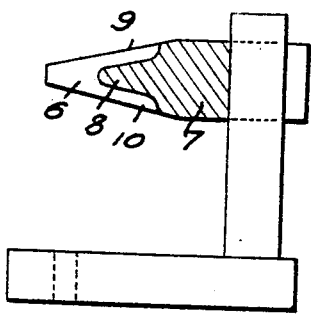
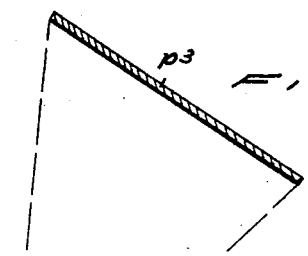
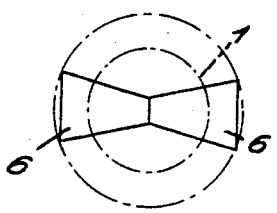
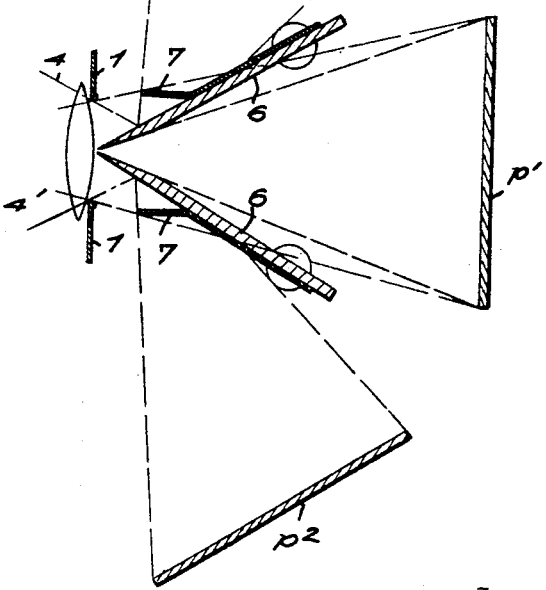
Inventor
R. F. P. Defregger
By
Langner, Parry, Card & Langner
Attorneys Patented Apr. 14, 1931

1,801,143

UNITED STATES PATENT OFFICE

ROBERT FRANZ PETER DEFREGGER, OF MUNICH, GERMANY, ASSIGNOR TO THE FIRM JOS-PE FARBENPHOTO GESELLSCHAFT MIT BESCHRANKTER HAFTUNG, OF HAMBURG, GERMANY

ART OF COLOR PHOTOGRAPHY

Application filed April 9, 1927, Serial No. 182,463, and in Germany April 27, 1926.

All proposals made heretofore in multicolor photography for simultaneous exposure of the three divisional plates by splitting up the bundle of rays passing through the lens or objective, have been associated with the drawback that the light is not evenly distributed over the whole field of the picture one or the other of the divisional plates being given comparatively more or less light than the other divisional plates, depending on the position of the plates in the field of the picture. The consequence is that one or the other color will be predominant in zones, which defect may be designated as adumbrations, and which require considerable retouching of the combined print.

Means for preventing the creation of adumbrations have been proposed heretofore; thus for instance, by the U. S. Patent 1,597,818, and the Canadian Patent 258,011, such fundamental requirements as opticians should observe for avoiding the creation of adumbrations, have been established. The object of the present invention is to find means which will not avoid adumbrations by optical means, but will compensate them by interposing opaque diaphragms in the path of the rays between the lens and the picture, adapted to reduce the opening for the range of that divisional plate for which too large an operative opening exists and which therefore receives too much light, thus outbalancing the distribution of the light in respect to the other divisional plates. By arranging such diaphragms and by giving the boundary lines the proper dimensions it is possible to compensate the adumbrations for mirrors of any shape, which otherwise would not be adapted to satisfy the requirement explained above, that is to compensate adumbrations to such an extent that they are no longer objectionable. It moreover happens that the optical requirements spoken of above cannot be fulfilled for the total extent of the plate, so that it may be necessary or advisable to admit for the range of the edges of the plate such condition of the lens that not merely the rear plane of the diaphragm acts as boundary of the rays. In these ranges of the plate then adumbrations will take place.

The invention will be described with reference to the accompanying drawing.

Fig. 1 is a side view of the invention.

Fig. 2 is a view on a sectional plane of the mirrors shown in Fig. 3, in which the mirrors are trapezoidal in form as illustrated, with the shorter edges of the trapezoidal plates contacting in the plane of the diaphragm and acting as boundaries for the rays, and extending at an angle of 30 to 40° into the space of the picture.

In the example shown more light will fall upon plates $p^2$ and $p^3$. By arranging a diaphragm or mask 7 in the plane of each mirror the equilibrium of the amount of light will be restored. The diaphragm 7 may be adjustable. The tongue 8 will be a means to uphold the equilibrium of the divers diaphragm openings of the objective uniformly.

The mask has a portion of the tongue 8 before being bent up that is still lying flush upon the mirror and that is narrower than the mirror. Thus, on both sides of the mask, that is, on the marginal edges 9 and 10 of Figure 1, the mirror will reflect rays. Of course the masks can not reflect but must be blackened.

The mirrors 6, 6 are of course only light reflecting mirrors and do not transmit the light. Rays will pass by, beside the mirror, and strike the plate $p'$ directly. Another portion of the rays is reflected by a mirror 6 to the plate $p_3$ and the third portion by a mirror 6 to the plate $p_2$.

I claim:—

1. Apparatus for compensating adumbrations in multi-color cameras in which intermediate and lateral divisional plates are provided, comprising mirrors oppositely inclined, positioned in front of the camera objective and extending into the central part of the luminous beam, said mirrors reflecting central as well as marginal rays from said beam upon the lateral divisional plates, and masks arranged between said lateral divisional plates and those portions of said mirrors remote from said objective, so as to compensate for unequal distribution of light intensity to corresponding image points on each divisional plate, inherent in the said arrangement of mirrors.

2. Apparatus for compensating adumbrations in multi-color cameras in which intermediate and lateral divisional plates are provided, comprising mirrors oppositely inclined, positioned in front of the camera objective and extending into the central part of the luminous beam, said mirrors reflecting central as well as marginal rays from said beam upon the lateral divisional plates, and masks lying in the planes of said mirrors coincident with the surfaces of said mirrors, arranged between said lateral divisional plates and those portions of said mirrors remote from said objective, so as to compensate for unequal distribution of light intensity to corresponding image points on each divisional plate, inherent in the said arrangement of mirrors.

3. Apparatus for compensating adumbrations in multi-color cameras in which intermediate and lateral divisional plates are provided, comprising mirrors oppositely inclined, positioned in front of the camera objective and extending into the central part of the luminous beam, said mirrors reflecting central as well as marginal rays from said beam upon the lateral divisional plates, and masks having portions arranged in the planes of said mirrors adjacent the marginal parts of the light beam and coincident with the surface of said mirrors, said masks having those portions adjacent the central part of the light beam turned angularly away from said mirrors, arranged between said lateral divisional plates and those portions of said mirrors remote from said objective, so as to compensate for unequal distribution of light intensity to corresponding image points on each divisional plate, inherent in the said arrangement of mirrors.

In testimony whereof I have signed my name to this specification.

ROBERT FRANZ PETER DEFREGGER.